Patented Aug. 20, 1940

2,211,987

UNITED STATES PATENT OFFICE 2,211,987

MATERIAL FOR TREATMENT OF HYDROCARBONS

Edward F. Quirke, Brooklyn, N. Y.

No Drawing. Application November 14, 1938,
Serial No. 240,377

5 Claims. (Cl. 44—8)

This invention relates to a compound for breaking up or dispersing of gums, emulsions, or sludges usually found or accumulating in fuel oil storage tanks over a period of time, and is an improvement upon the compound forming the subject matter of my pending application S. N. 133,383, filed March 27, 1937.

The said prior application is directed to a compound of general application and of particular advantage in connection with heaters and furnaces where incrustation of hard carbon is present or probable. The present invention, while having certain advantages in the same connection, is more specific in its advantages in storage tanks and supply lines to burners, heaters and so forth, and for removing or dispersing sludge, and for breaking up and carrying off gummy and/or "dry putty" carbon.

Fuel oils vary in type or character. Oils of higher gravities ranging from 26 to 36 will form an emulsion in the storage tanks of a gummy or resinous nature containing more or less water, and in addition, a coating of gum will also form on and adhere to the sides and bottom of a tank. As fuel oil in the tank is gradually drawn off for consumption a time will ultimately arrive when the emulsion or sediment will clog the strainer on the burner apparatus, causing a variety of electrical and combustion troubles, including formation of an excessive amount of soot in a boiler and reduced heating efficiency. The same may be said of industrial operations using these higher gravity oils.

Oils of a gravity ranging from 20 to 26 will form a sludge of a viscous nature and entirely different from that usually found in tanks storing high gravity oils. The sludge, especially from asphalt base oils, if allowed to stand for some time, will eventually pack into a semi-solid mass resembling an oily asphalt. The depth of this asphalt will vary with the length of time during which the tank has not been cleaned. Usually there is more or less water present in the tank.

Tanks used for the storage of heavy oils of 8 to 20 gravity accumulate a heavy viscous mass, sometimes resembling a heavy slime and at other times resembling a soft oily asphalt. Oils of 8 to 10 gravity have to be heated, and consequently, in the oil burning equipment for such oils is included an apparatus called a "pre-heater" containing a system of tubing. In due course a coating of carbon builds up on the tubing which reduces the efficiency, and/or decreased the atomization of the oil. In those tanks where a high degree of heat has been maintained, there is a tendency for a heavy coating of carbon or asphalt to bake on the tank heater coils, and also to precipitate to the bottom a deposit of semi-solid asphalt. Water is always present in storage tanks containing oils of this type, usually in small pools and pockets. Oils of gravity greater than 20 to 22, do not require heating as they are sufficiently and amply fluid to flow or respond to pumping to and through the apparatus or oil burner, and accordingly no pre-heaters are included in systems using such oils, which, for convenience may be referred to as "lighter gravity oils." The present invention has relation to these lighter oils.

An object of the invention is to provide an improved compound for use particularly with the lighter oils for breaking up or dispersing the gums, emulsions or sludges found or accumulating in storage tanks.

A further object is to provide such a compound which will also tend to reduce the viscosity of the fuel oil in which used.

Another object is to not only break up the sludges or emulsions in such a way that they will pass along with the fuel and be consumed as fuel likewise clearing the lines of sediment, but to also avoid clogging the strainers and avoid forming carbon on the burners.

Again, an object is to combine water present in the tanks with the oil and pass it along to the burners in such minute quantities as not to shut off the flame or cause any interruption or lowering of the flame by which the efficiency of the flame might be lessened. The constancy and efficiency of the flame is of utmost importance in both metallurgical and power plant operations.

An important object of the invention is to provide a composition which is stable when in bulk form under ordinary atmospheric conditions so that it will be suitable for use for a long period of time without becoming a hard dense mass, or soggy.

Another object of the invention is to not only break up sludges or emulsions tending to form after the compound is introduced into the oil, but to also remove sediment or incrustations which have formed in the tank and in the oil supply lines prior to introduction of the compound of this invention therein.

Yet again, an object of the invention is to reduce the viscosity of oils, especially those from 8 to 24 gravity, and to lower the cold pour point.

Finally, it may be said objects of the invention include the breaking up of emulsions and sludges gradually enough so the dispersed particles at any one time will not be excessive and the degree of fineness will be such that the particles will not clog the strainer; to avoid use of ingredients either detrimental or unnecessary for accomplishing the desired results; to provide a compound universally applicable for successful commercial application for the domestic oil heating business; to secure simplicty and economy, and to obtain other advantages and results as may be brought out in the following description.

In developing the present invention, consideration was given to the necessity of having a compound that would not become soggy or pack in a hard mass. Where either of those conditions take place, the effectiveness of the compound would be greatly reduced even if not entirely lost. It is highly essential that the structural and/or chemical characteristics of my compound be such that it will get into intimate contact with the carbon or asphalt, it accordingly being necessary that the compound be in such a finely powdered form as to promote the "marrying" of atoms of the compound with atoms of the carbon or asphalt. This intimate contact or marrying of the atoms is in effect an attack upon the carbon or asphalt, either in the oil, sludge or emulsion, tending to fracture or break up the carbon or asphalt into such a finely subdivided product that it will pass off with the oil through the system and not cause en route any trouble at the strainers or the burners nor lower or interrupt combustion.

The composition of the present invention comprises a polycyclic hydrocarbon and a caustic, which I find, after long effort and experimenting, will fulfill the foregoing recited objects of the invention. Since a caustic is used which contains a percentage of water, it appeared desirable to use a protecting element which would be effective against the hydrogen element of the caustic as against the other element of the compound or as against any humid condition of the atmosphere for overcoming the effect on a caustic when exposed to air for a period of time of running to liquid by reason of the water content and thus inducing a soggy mass in the container. Otherwise, when tightly sealed in the container the mass, or compound, would be hard so that when broken up it would be in lumps, and its efficiency greatly lowered or be ineffective in that it would not "marry" the carbon or asphalt clusters, or penetrate through the heavy emulsions or sludges so as to cause what I term an activation and a breaking up of the said sludges or emulsions. And further, I found by test and experience that such a soggy or hard lump of a compound would not dissolve of itself when in the tank, and would be taken up by the pump, and clogged the strainers, shutting down the oil burner apparatus.
Therefore, following the lead of predecessors and contemporary workers, I used various elements as a protecting agent and particularly the stereotyped zinc stearates and aluminum oleates and stearates which are supposed to be effective for this purpose of protective agent.

It was my experience however, after numerous practical applications of a compound which contained the said stearates or oleates that the two elements mentioned were ineffective in that they did not prevent or minimize a soggy condition of the compound when exposed to air nor did either prevent the compound from becoming hard or lumpy when packed and kept in a sealed container for a period of time.
I also found that a compound containing anything of a fatty acid nature acted adversely where fuel oil was used in the copper and brass industry for annealing and heat treating. That is, the fatty acids, notwithstanding they become a product of combustion, carry over and stain or discolor the copper, brass or bronze with a species of green or mottled stain which makes them unacceptable in commerce. As compounds for breaking up sludges or emulsions will be bought by fuel oil distributors and applied to tanks as the occasion dictates, it is not possible to have fuel oil distributors carry compounds for various purposes. They require a compound which is general in its application. These stearates and oleates contain fatty acids in that stearic acid is used in their production. Also, it was found that at high furnace temperatures there was a tendency, where these oleates or stearates were a part of the compound, for a hard incrustation or formation, to develop on the burner tip and finally close up the oil orifice resulting in a shut down of operations, or constant attendance of an operator for frequent clearings.

It was also found that where these oleates and stearates, as well as similar elements, were included in a compound, that trouble developed in that there was a clogging of strainers and a hard gum formation in some of the working parts of burners and the oil seemed to be more viscous. On checking it developed that aluminum stearates are used for water proofing fabrics, also as paint and varnish driers and for thickening lubricating oils. While soluble in petroleum and alkalis the stearates appeared to produce the trouble mentioned above. The same may be said of aluminum oleates.

Finally, over a period of time a compound employing a polycyclic hydrocarbon and a caustic was found to be suitable for breaking up sludges or emulsions and causing same to pass along with the oil and be consumed as fuel, as well as removing sediment from the oil supply lines. It was also found that the water content of the emulsions or sludges was taken up by the oil and passed along to the burner without lowering the efficiency. Sediment was also removed from the oil supply line, as evidenced by a rise in pressure. By careful mixing and grinding I was able to develop a compound that would remain stable under all conditions. This compound, over a period of time was tried under varying conditions of use, and sales made were paid for and most generally a guarantee of performance was demanded.

This compound was successful in breaking up sludges or emulsions, removing or eliminating formations from the burners and sediments for the oil supply lines. It was found that this compound reduced the viscosity of fuel oils particularly of the heavier type of from 8 to 20 gravity.
Combustion was aided and there was no carbon formations on the walls and bottoms of combustion chambers. I do not claim that this compound will add any heat, or what is termed B. t. u value, to fuel oil.
In my compound I employ polycyclic hydrocarbon and a caustic, but vary the proportions depending upon the type of oil to be treated. I may use a percentage, as an example, of 70% of a polycyclic hydrocarbon and 30% of a caustic for heavy oils ranging from 8 to 20 gravity; or the polycyclic hydrocarbon element may be 80% and the caustic 20% for lighter oils. I do not limit myself to this range as in the case of fuel oils from certain fields on the Pacific Coast of a waxy asphalt nature I would possibly use a mixture containing 50% of a polycyclic hydrocarbon and 50% of caustic. The polycyclic hydrocarbon is selected from the group consisting of naphthalene, anthracene and phenanthrene. The caustic is selected from the group consisting of caustic soda, caustic potash and lime. One or more from each group may be used in the compound.

Several years of trial and successful use has demonstrated that my compound needs no agitation manually or mechanically after it is added to the oil, sludges, or emulsions in the tank. It can be added by way of the man-hole of the tank simply by scattering the compound over the surface of the sludge or oil; or it can be poured down the fill line at the time of receiving a load of oil. This compound has permeated a sludge of a depth of 36" in large size tanks, breaking it up and causing it to pass off with the oil, as also the water, and be consumed as fuel, thereby recovering the money value of the sludge.

In application I generally use about one pound to 400 or 500 gallons of oil and sludge where oils of 8 to 20 gravity are involved. Sludges or emulsions from oils of from 24 to 36 gravity can be removed from tanks on the basis of about one pound to 800 to 1000 gallons.

For continuous treating of oil so as to prevent sludge and carbon formations I have found that one pound to 1000 gallons is effective for the purpose on all types of oils.

The compound described herein has been found suitable for the breaking up and dispersion with the oil, of sludges, or emulsions, from oils of 20 to 36 gravity. No heat is required for the pumping or atomization of oils of these gravities. It has worked very satisfactorily on sludges resulting from oils of 8 to 20 gravity, which require heat for pumping and proper atomization. However, these latter oils, in due course, will cause a coating of carbon or asphalt to form on the heating tubes of what is styled a pre-heater, or heater. As regards the oil of 16 to 20 gravity the first formation is a soft oily asphalt which becomes eventually a layer resembling a "dry putty." My compound has been effective in removing a soft oily asphalt condition and sometimes it will break up the "dry putty condition," but is not always wholly effective. The carbon or asphalt formation on the heater tubes of heaters handling oils from 8 to 16 gravity will run as follows; first, a soft oily asphalt formation succeeded by a putty-like formation and in turn becoming a hard carbon coated running from $\frac{1}{16}$" to $\frac{3}{32}$" thick—sometimes $\frac{1}{8}$" if the heater is working on high oil temperatures. My compound has been effective for removing a soft oily asphalt. It is ineffective in removing the hard, or third layer, of carbon. At times it is effective on the putty-like carbon but it cannot be offered on the market in a broad commercial way, with assurance to the purchaser that it will successfully remove the two inner layers of carbon as described.

While the compound will help out in many cases as regards fouled heaters it cannot be offered on the market with assurance that it will wholly perform in this direction.

In my said prior application, I have included as one ingredient, a phosphate element which I find for the purpose of this invention may well be omitted. The phosphate disclosed therein has little or no effect in adding to the fluidity of the sludge or emulsion, and inasmuch as the present compound when used for the lower gravity oils serves primarily for increasing the fluidity I find the phosphate may accordingly be omitted. With respect to the oils of lighter gravity, that is from 20 to 22 gravity and above, heaters are not used as a part of the oil burning system, and a compound for use with such oils I find is far superior without any phosphate element than it is with use of the phosphate element. According to my experience the compound of the present invention works effectively in oil storage tanks at bulk or field terminals, railroad fueling plants, in domestic and other burners where lighter oils are employed, and in other places and uses too numerous to mention, where the essential difficulty to be remedied is the dispersion of sludge and cleaning of oil lines.

I have also found that with oils of a paraffin base and in the lighter gravities, that inclusion of a phosphate would result in the compound working too rapidly, that is, the sludge or emulsion would break up so fast that the particles would be in too great proportion and would plug the strainer of the system. This is more especially the case with the lighter oils because the strainers used in connection therewith, and especially with domestic heating installations, are all a very fine mesh ranging from a 100 to 150. I therefore find that it is desirable to break up the emulsion gradually so as to produce no excessive accumulation of particles on the strainer and to obtain a gradual breaking up which will be conducive to increased fineness of the particles thereby enabling them to pass through the screens of the strainer in normal flow of the oil and thus avoid the banking up to the particles and clogging of the strainer. While it is apparently true that, with asphaltum base oils of the lighter gravities, the action of the phosphate is not so pronounced as to rapidity of breaking up the emulsion, sales experience has proven that for successful commercial purposes, particularly in connection with the domestic oil heating business, a compound should have universal application regardless of the type of oil employed, since the usual customers do not distinguish between the paraffin base and the asphaltum base oils, and therefore a single compound usable with either type is most desirable.

My compound has proven successful with both types of oil and its simplified composition omitting the phosphate of the said prior application is accordingly found to give beneficial results with all of the oils of lighter gravity. The invention accordingly is one by which I am enabled to eliminate the phosphate element of the invention of my preceding application and obtain superior results by the intimate admixture of polycyclic hydrocarbon and caustic of selected proportions more specifically recited above and chosen with regard to the character of oil and conditions to be met. The particular compound is one which will not discolor brass, copper or bronze, will enable a flame to be produced with a minimum or entire absence of smoke, will eliminate and prevent carbon formation on burners, will produce a hotter and softer flame and reduce the spalling of brick work or combustion chambers, and will reduce the viscosity of oil, thereby enabling heavier oils to also be used, particularly since the compound reduces the pouring temperature of such heavy oils.

Since the various details of composition as well as the precise steps of the preparation and use and choice of ingredients are subject to variation and change without departing from the inventive concept or scope of the invention, it is intended that all matter contained in the above description shall be interpreted as illustrative and not in a limiting sense. It is also to be understood that the following claims are intended to cover all of the generic and specific features of the invention herein described and all statement of the scope of the invention herein described which as a matter of language might be said to fall therebetween.

I claim:

1. A composition for treating fuel oil of the type tending to clog fuel lines and tending to deposit substantial quantities of sludge in storage tanks, and to break up and prevent such clogging and depositions in use, consisting of a proportion in the range from 80 to 50 per cent polycyclic hydrocarbon together with a substantially complementary proportion in the range from 20 to 50 percent of a caustic alkali in a mixed and powdered state.

2. A composition for treating fuel oil of the type tending to clog fuel lines and tending to deposit substantial quantities of sludge in storage tanks, and to break up and prevent such clogging and depositions in use, consisting of a proportion in the range from 80 to 50 percent polycyclic hydrocarbon selected from the group consisting of naphthalene, anthracene and phenanthrene together with a substantially complementary proportion in the range from 20 to 50 percent of a caustic alkali in a mixed and powdered state.

3. A composition for treating fuel oil of the type tending to clog fuel lines and tending to deposit substantial quantities of sludge in storage tanks, and to break up and prevent such clogging and depositions in use, consisting of a proportion in the range from 80 to 50 percent polycyclic hydrocarbon together with a substantially complementary proportion in the range from 20 to 50 percent of a caustic alkali selected from the group consisting of caustic soda, caustic potash and lime in a mixed and powdered state.

4. A composition for treating fuel oil of the type tending to clog fuel lines and tending to deposit substantial quantities of sludge in storage tanks, and to break up and prevent such clogging and depositions in use, consisting of a proportion in the range from 80 to 50 percent polycyclic hydrocarbon selected from the group consisting of naphthalene, anthracene and phenanthrene together with a substantially complementary proportion in the range from 20 to 50 percent of a caustic alkali selected from the group consisting of caustic soda, caustic potash and lime in a mixed and powder state.

5. Composition for treating fuel oil which tends to deposit sludge in storage tanks consisting of approximately 75% naphthalene and 25% caustic soda.

EDWARD F. QUIRKE.